United States Patent [19]
Lee

[11] Patent Number: 5,787,230
[45] Date of Patent: Jul. 28, 1998

[54] SYSTEM AND METHOD OF INTELLIGENT MANDARIN SPEECH INPUT FOR CHINESE COMPUTERS

[76] Inventor: Lin-Shan Lee, 3F, No. 7, Lane 58, Wen-Chou St., Taipei, Taiwan

[21] Appl. No.: 352,587

[22] Filed: Dec. 9, 1994

[51] Int. Cl.$^6$ ........................................... G10L 9/06
[52] U.S. Cl. .................. 395/2.44; 395/2.69; 395/2.64; 395/2.79
[58] Field of Search ..................... 395/2.44, 2, 2.6, 395/2.5, 2.65, 2.42, 2.49, 2.64, 2.62, 2.86; 381/43, 41, 42, 44; 364/419

[56] References Cited

U.S. PATENT DOCUMENTS

| | | | |
|---|---|---|---|
| 5,027,406 | 6/1991 | Roberts et al. | 381/43 |
| 5,164,900 | 11/1992 | Bernath | 364/419 |
| 5,212,638 | 5/1993 | Bernath | 364/419 |
| 5,220,639 | 6/1993 | Lee | 395/2 |
| 5,224,040 | 6/1993 | Tou | 364/419 |

OTHER PUBLICATIONS

Lee et al., ("Golden Mandarin (I)—A Real-Time Mandarin Speech Dictation Machine for Chinese Language with very Large Vocabulary", IEEE Transactions on Speech and Audio Processing, Apr. 1993, vol. 1, Issue. 2, pp. 158–179).

Yang et al., ("Hidden Markov Model for Mandarin Lexical Tone Recognition", IEEE Transactions on Acoustics, Speech and Signal Processing, vol. 36, Issue. 7, Jul. 1988, pp. 988–992).

Ting et al., ("New Speech Recognition Approaches Based Upon Finite State Vector Quantization With Structural Constraints", ICASSP'88, Acoustics, Speech & Signal Processing Conference, Sep. 1988, pp. 187–190).

Lee et al., ("The SYnthesis rules in a Chines text–to–speech system", IEEE Transactions on Acoustics, Speech and Signal Processing, vol. 37, Issue. 9, Sep. 1989, pp. 1309–1320).

Lee et al., ("A fully parallel Mandarin Speech recognition system with very large vocabulary and almost unlimited texts", Circuits and Systems, 1991 IEEE International Symposium, Apr. 1991, pp. 578–581).

*Primary Examiner*—Allen R. MacDonald
*Assistant Examiner*—Vijay B. Chawan
*Attorney, Agent, or Firm*—Cushman Darby & Cushman Intellectual Property Group of Pillsbury Madison & Sutro LLP

[57] ABSTRACT

A Mandarin speech input system and method for directly translating arbitrary sentences of Mandarin speech into corresponding Chinese characters is disclosed. The system and method comprises acoustic processing section and linguistic decoding section. The acoustic processing step employs "Segmental Probability Models" to calculate the probabilities of each of the mono-syllables in the Mandarin speech input and each of the tones thereof for further recognition. The linguistic decoding step employs "Word-class-based Chinese Language Models" to locate the corresponding Chinese characters for the series of recognized syllables provided by said acoustic processing step. A Mandarin dictation machine translates the provided speeches into characters in accordance with above method and displays the characters. The dictation machine is featured for the "intelligence" that can "learn" if taught by including several "intelligent learning techniques" such as automatic new user's voice learning to enable the new user can use the dictation machine quickly, automatic environmental noise learning to adapt to the environmental noise in the user's environment, and continuous on-line learning of user's voice, special words, wording and sentence styles to continuously improve the correct recognition rate.

19 Claims, 8 Drawing Sheets

$$\text{Prob}(\beta) = \prod_{t=1}^{n_2-1} b_1(o_t) \cdot \prod_{t=n_2}^{n_3-1} b_2(o_t) \cdot \cdots \cdots \prod_{t=n_N}^{T} b_N(o_t)$$

WHEREIN $b_j(o_t) \stackrel{\Delta}{=} \max_{m=1,2\cdots,M} \{b_{jm}(o_t)\}$, $j=1,2,\cdots,N$.

$b_{jm}$ REPRES THE GAUSSIAN PROBABILITY DISTRIBUTION FUNCTION CONSTITUTED BY $\bar{\mu}_{jm}$ AND $\bar{\sigma}^2_{jm}$ SHOWN IN FIG. 2

SYSTEM AND METHOD OF INTELLIGENT MANDARIN SPEECH INPUT FOR CHINESE COMPUTERS

BACKGROUND OF THE INVENTION

The present invention relates to an intelligent mandarin speech input method and an intelligent Mandarin dictation machine. More accurate recognition for Chinese characters can be realized by means of Mandarin speech input in accordance with the present invention.

Today, the methods for entering Chinese characters into computers are numerous, for instance, those based on phonetic symbols, character radicals or strokes thereof. However, none of these methods have been recognized as the best, since no input method is really convenient to the users. Some input methods may be relatively slow in operation speed, while some methods require special training, or require recall of numerous rules for character radicals which may be forgotten as a result of infrequent use. For instance, the "phonetic symbol input method" is readily practiced by everyone without substantial training, but this input method is still not popular due to its relative slow speed. Although the fastest input methods for Chinese characters are probably the so-called Tsang-jiieh method, Ta-yi method or other similar character radical methods, these methods can only be used by professionals who have received long-term training. The general public will forget such methods if they have not been frequently used. The fact that each of the Chinese characters has been irregularly translated into several radicals represented by key strokes of a typical English keyboard makes these methods inconvenient. Actually, the English keyboard was initially designed for alphabetic languages such as English and it is, therefore, inconvenient for non-alphabetic Chinese characters to be entered.

A possible method, which has long been proposed, is to enter Chinese characters by means of speech. However, because some critical technical problems that are nearly unsolvable are encountered by inputting Chinese characters by speech, no such method has been commercialized. The major technical problems are:

(1) The vocabulary required for the Chinese language is too large for speech recognition technology. At least 10,000 Chinese characters are commonly used and at least 160,000 Chinese words are commonly used (including all mono-characters and polycharacter words). This is beyond the feasibility of available technology;

(2) Too many homonym characters and words that may not be easily distinguished exist in the Chinese language even if the pronunciations have been correctly recognized; and (3) It is difficult to translate Mandarin speech into Chinese characters in real-time using low-cost devices, because the computation described in problems (1) and (2) can not be carried out in a very short time period.

U.S. Pat. No. 5,220,639, invented by the applicant of the present invention, can substantially mitigate the problems described above. The cited patent is incorporated herein by reference. The main content of the U.S. patent is as follows:

(1) Mandarin mono-syllables are chosen as the acoustic units for recognition. Although the number of Chinese characters and words are huge, the number of different mono-syllables is limited to about 1,300 which can be realized by present speech recognition technology. The recognized syllables along with their preceding and following syllables together with some linguistic information can be used to decode the corresponding words or sentences constructed therefrom.

(2) Chinese language models can be established by means of the Markov Models based on Chinese text corpus. Numerous training texts are used to measure the probabilities with respect to each available character preceded or followed by one or more other characters. These probabilities can be utilized to determine that if a particular syllable is preceded or followed by one or more other syllables, which character is most likely represented by the syllables in question. This method can solve most homonym problems, while erroneous homonyms can then be manually corrected on the screen.

(3) Specialized hardware is incorporated to complete complex calculations in the shortest time period.

However, although the cited patent may basically solve the problems described above, it has some inherent limitations.

(1) A large amount of computation is required. In order to realize the dictation of Mandarin on a real-time basis (that is, to complete a large amount of computation in the shortest time period), some specialized hardware must be incorporated. This makes the implementation of the cited patent expensive.

(2) The correct recognition rate is still not high enough (about 89%) to free the users from repetitive corrections.

The above two limitations have, until now, prohibited the cited patent from being commercialized.

In view of these limitations of the cited patent, two new critical techniques based on the original concepts have been developed in the present invention.

(1) To deal with the special features of mono-syllables in Mandarin, "Segmental Probability Models" dedicated to Mandarin mono-syllable recognition have been developed.

(2) To deal with the Chinese language structure, "Word-Class-Based Chinese Language Models" have been developed.

According to the present invention, two techniques, developed for the characteristics of Mandarin Chinese, are combined together to dramatically reduce the required amount of calculations, while increasing the correct recognition rate. Therefore, it is not necessary to design specialized hardware to perform real-time input, whereas all techniques can be implemented by means of software which is easily incorporated into a DSP (Digital Signal Processing) board provided with a DSP chip (since such chips and boards are available in the market, it is easy to develop various products through different boards or chips). If the computation speed of the chip is fast enough and the memory space of the board is large enough, real-time input can be ensured. Such a board can be plugged into a slot of any AT (or above) personal computer. Therefore, it is very convenient to use, and the cost can be dramatically reduced. Based on the new fundamental techniques and their features, the present invention further develops several "Intelligent Learning Techniques" to provide a dictation system of the present invention with intelligence which can "learn". These techniques include: automatic learning of a user's voice so that new users can use the system quickly; automatic learning of user's environmental noise and adapting to such noise; and continuous on-line learning of a user's voice, special words, wording and sentence styles to continuously increase the correct recognition rate during the machine's use.

All these features will be explained in the detailed description of the preferred embodiment hereinafter.

SUMMARY OF THE INVENTION

The present invention is to provide a mandarin speech input system and method for a Chinese computer. This system is developed with a method of speech processing technology and is implemented in the form of a dictation machine in accordance with such technology. This machine can receive dictation of arbitrary Mandarin sentences. In other words, when the user utters arbitrary Mandarin sentences, these sentences can be recognized and translated into characters by the dictation machine. These characters are then displayed on the screen of a monitor (in Chinese). This machine acts just as a "secretary" which enters the Chinese characters into the computer after listening to the user's sentences. After these characters have been entered, subsequent procedures such as word processing, modification, editing, storage, print-out or transferring to a peripheral apparatus can be carried out. In short, this dictation machine enables the Chinese computer to "listen to" Mandarin speech. The machine in accordance with the present invention is different from the conventional Mandarin speech recognizer in the following ways:

(1) It can deal with arbitrary sentences constructed by using a very large vocabulary (there are at least 160,000 frequently used words and at least 10,000 frequently used characters in the Chinese language);

(2) Characters can be entered in real time, i.e., the translation of a sentence into Chinese characters shall be completed once the user has finished speaking the sentence.

These two differences constitute the technical bottleneck for the commercialization of Mandarin a dictation machine. Therefore, no successful product has ever been on the market until now. The existing "Mandarin speech recognition systems" developed by some research institutions are either capable of recognizing only a limited vocabulary (for example, 100 city names), or they have a poor recognition rate. These products, which are inconvenient to the users, are different from the machine in accordance with the present invention.

Because it is very difficult to realize such a "Mandarin dictation machine" in terms of technology, the present invention accommodates the above concepts subject to the following three conditions:

(1) Speaker dependent: That is, a particular machine can only accept the speech of a particular user at a time. Every user can first speak to the machine so that his speech is used as the "Training Speech" for the machine. After the machine has been "trained" by the "Training Speech" of a particular user, the machine can then accept the speech of the particular user. If the machine is then used by another user, the other user can use his speech as the training speech to re-train the machine. This process can be carried out without much difficulty as this machine can only be used by one person at a time. Those users speaking with different accents can also use the machine because the machine can also be trained by the "Training Speech" with an accent.

(2) The input speech is in the form of a series of "isolated mono-syllables": every Chinese character is pronounced as a mono-syllable. But in a continuous sentence, the signals of each mono-syllable thereof are joined together. The co-articulation effect across the syllables of the sentence make the correct recognition of the mono-syllables difficult. In fact, the user can simply pronounce isolated mono-syllables of the characters for those input sentences and can still very conveniently and rapidly enter the Chinese characters, avoiding the problems caused by the co-articulation effect.

(3) Limited errors in the input of Chinese characters are allowable: In fact, errors may occur in any input method. If erroneous characters occur, they can be displayed on the screen and the user can easily correct them by means of user-friendly software. Under these conditions, it is estimated that about 150 Chinese characters per minute can be entered into the computer through the machine in accordance with the cited patent, of which about 17 characters need to be corrected. Because the correction software is very convenient to use, the "net input" is about 110 characters per minute. If the machine in accordance with the present invention is used, better results can be realized. Please note that the speed of a fastest input method currently available in Taiwan is about 110 characters or more, but this is only achieved by very well-trained professionals who have received long-term training. However, the general public equipped with machines in accordance with the present invention can reach this level.

It is therefore the major object of the present invention to provide a Mandarin speech input method and a resultant Mandarin dictation machine for the Mandarin-speaking public to conveniently and quickly enter Chinese characters without special training and without the need to memorize input rules.

BRIEF DESCRIPTION OF THE DRAWINGS

These and other objects and advantages of the present invention will become more apparent by reference to the following detailed description of the preferred embodiments, when read in conjunction with the accompanying drawings, in which.

DETAILED DESCRIPTION OF THE PREFERRED EMBODIMENT

Figure 1:
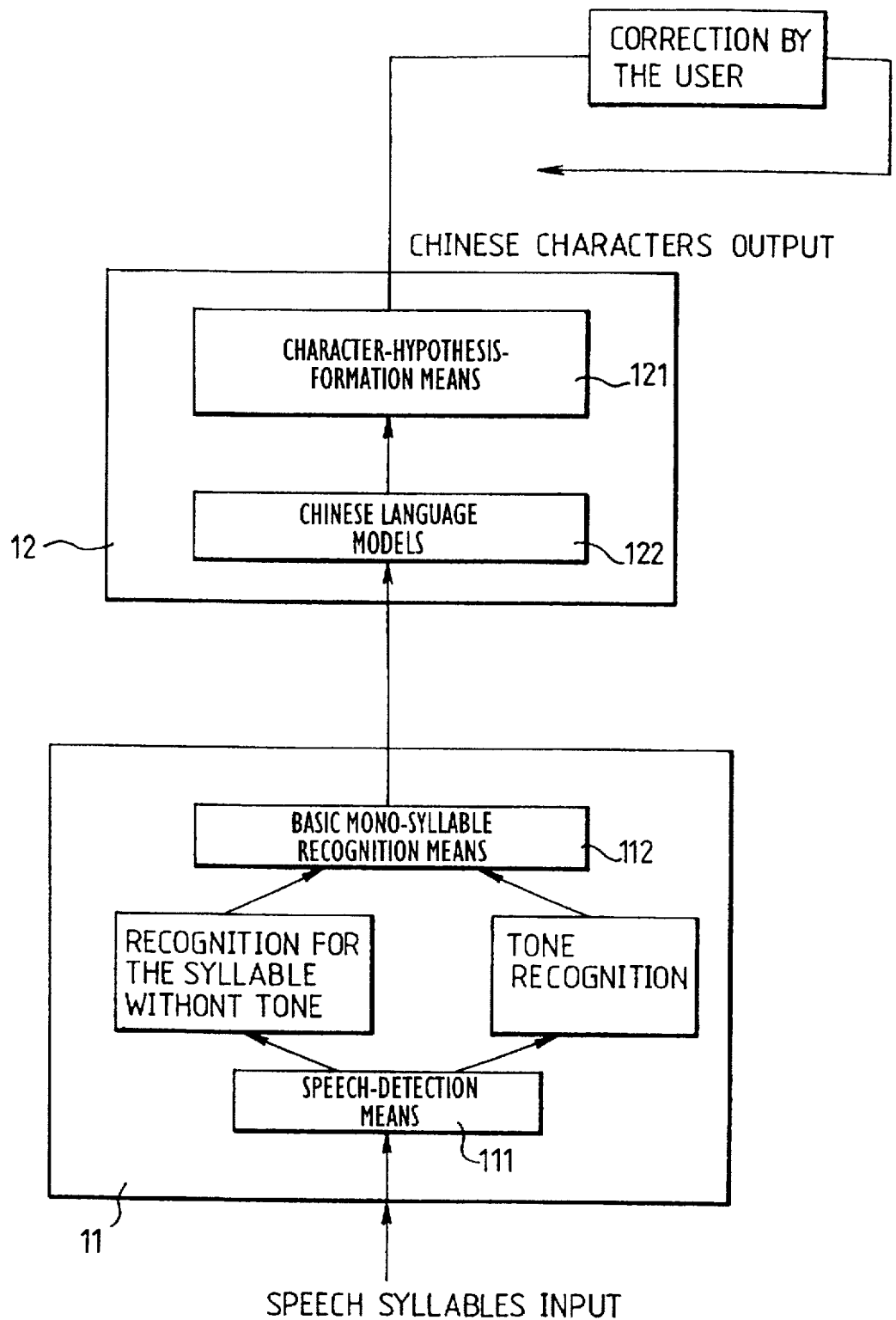
FIG. 1 illustrates a basic block diagram showing the principle and structure of the present invention.

FIG. 1 shows the basic principle and structure of the present invention. The present invention mainly comprises an acoustic processing section 11 and a linguistic decoding section 12. The acoustic processing section 11 which comprises a speech-detection means 111 is responsible for recognizing the correct mono-syllables contained in the entered speech signals by means of speech processing. The linguistic decoding section 12 which comprises character-hypothesis-formation means 121 and a Chinese language model 122 is used to identify the exact characters based on the recognized series of mono-syllables provided by the acoustic processing section. In the acoustic processing section 11, the endpoints of the input mono-syllables are first detected by the speech-detection means 111 and then the detected mono-syllables are recognized in parallel by means of a basic mono-syllable recognition means 112 ("basic monosyllable" means the syllable disregarding the tone, for example, the recognition for "ti") and a tone-recognition means 113 (for example, recognizing a fourth tone for the above example). After the recognition of the input speech, the complete syllable is thus recognized as "ti-4" (the number with the preceding hyphen indicates the tone of the mono-syllable). The recognized syllables are then sent to the linguistic decoding section 12 so as to pick up the correct characters from the corresponding homonym character sets each including characters having the same pronunciation. In this section, all characters having the same pronunciation (or the homonym characters) are first selected by the Character-Hypothesis-Formation means 121. Then, the homonym character with the maximum probability (or the highest likelihood) is located by means of the Chinese Language Models 122. If the output characters are incorrect, the user can correct them on the screen.

The endpoint detection process, that is firstly performed by the acoustic processing section 11 shown in FIG. 1 in accordance with the present invention, will now be described. This process is a well known technique to those who are skilled in the art of speech recognition. Basically, the waveform of an input speech signal is sampled by an A/D converter integrated with a sample-and-hold circuit, and converted into a digital data stream which is then applied to the computer. Using the digital data, the instantaneous energy (that is, the energy intensity in a very short period of time) and "zero-crossing rate" (that is, the number of transitions of the waveform from positive to negative through "zero" in a time unit) can be calculated by the computer. With these two feature parameters, the computer can judge the start and end of the speech signal, and discard the remaining noise. For instance, the instantaneous energy of the "final" of a Mandarin syllable (the vowel or diphthong part but including possible medials or nasal ending) is significantly higher than that of the noise; the instantaneous energy of the "initial" of a Mandarin syllable (the initial consonant) may not be high, but the "zero-crossing rate" is significantly higher than that of the noise. As a result, the noise and the speech signal can be effectively distinguished, and a further recognition of the speech signal can then be carried out separately.

The "basic mono-syllable recognition" process in the acoustic processing section will now be described. The total number of different mono-syllables in Mandarin is about 1300. If the differences caused by lexical tones are disregarded, the total number of basic mono-syllables in Mandarin is reduced to about 408. For example, if "ba-1", "ba-2", "ba-3", "ba-4" and "ba5" (here each of the numbers with the preceding hyphen indicates the tone of the syllable) are considered as five different mono-syllables, the total number of different mono-syllables will be about 1300. If they are treated as one basic mono-syllable, the total number will be about 408. As the lexical tones are independently considered in the present invention, therefore the input syllables are recognized relative to these 408 basic mono-syllables. After in-depth research for several years, it has been found that better results can be obtained by means of the "Segmental Probability Models" developed for dealing with the characteristics of Mandarin mono-syllables in accordance with the present invention as compared with the "Continuous Hidden Markov Models" described in the cited patent. There are many confusing sets, i.e., sets of mono-syllable candidates for speech recognition which are very difficult to recognize, among the collection of the 408 basic mono-syllables of Mandarin disregarding the tones. For instance, the a-set is (ba, pa, ma, fa, da, ta, na, la, ga, ka, ha . . . . etc.). The special training algorithm for the above "Segmental Probability Models" was developed by the applicant of the present invention at the National Taiwan University, in order to deal with the characteristics of Mandarin mono-syllables.

Figure 2A:
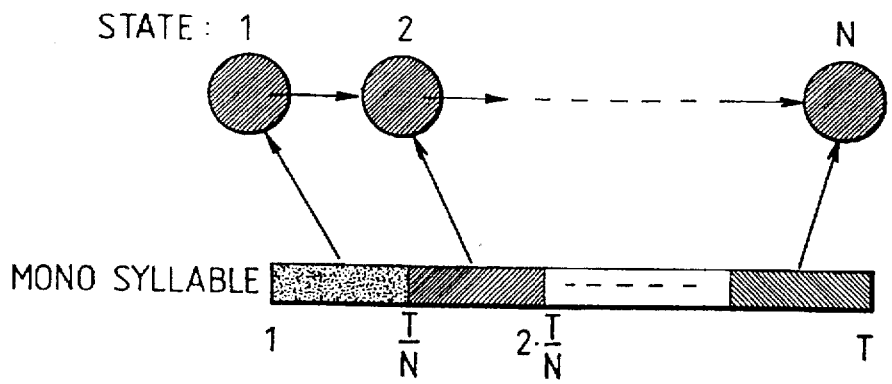
FIGS. 2(a) and 2(b) illustrate schematic diagram of "Segmental Probability Models" in accordance with the present invention and the training manner thereof, respectively.
Figure 2B:
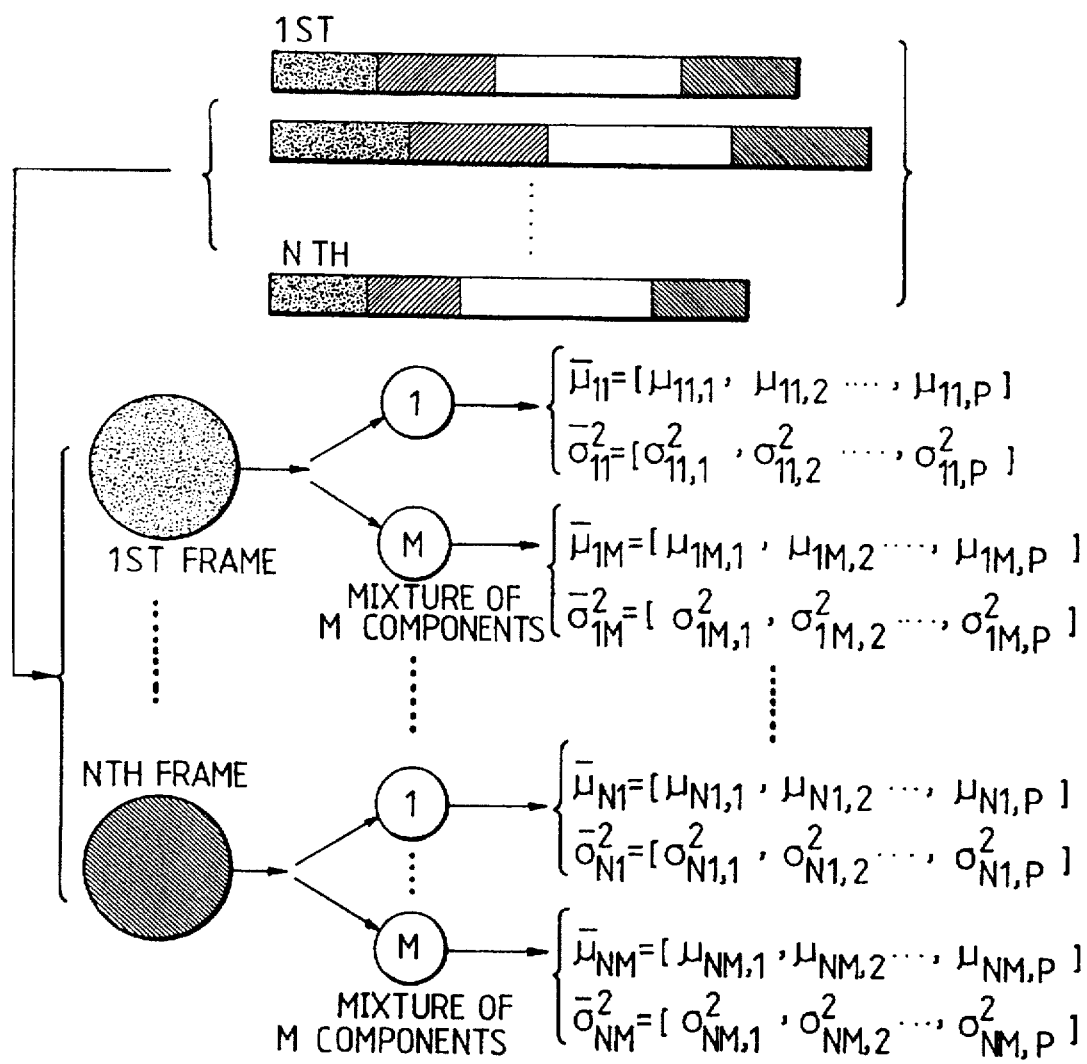

FIGS. 2(a) and 2(b) respectively illustrate the basic principle and training algorithm of "Segmental Probability Models" in accordance with the present invention. As shown in FIG. 2 (a), if a certain syllable $\alpha$ having duration of T frames is divided into N segments, then each segment accounts for T/N frames, represented by one of N states respectively. FIG. 2(b) shows the training algorithm in accordance with the "Segmental Probability Models". Assuming that the syllable $\alpha$ has been pronounced several times (for example, L times), where the duration of each of these L utterances may be different, but they can all be equally divided into N segments respectively, then the feature vectors of frames in each of the first segment of all the utterances are collected to train the state of the first segment of the syllable $\alpha$, and the feature vectors of frames in each of the second segment of all the utterances are collected to train the state of the second segment of the syllable, and so on. Each state (or segment) is described by a Mixture of Gaussian distributions with M components. The parameters of each state (or segment) is then obtained from the training process performed on the feature vectors of frames collected for the segment into M components. The resultant N states with their Gaussian distribution parameters constitute the "Segmental Probability Model" of the syllable $\alpha$.

Figure 3:
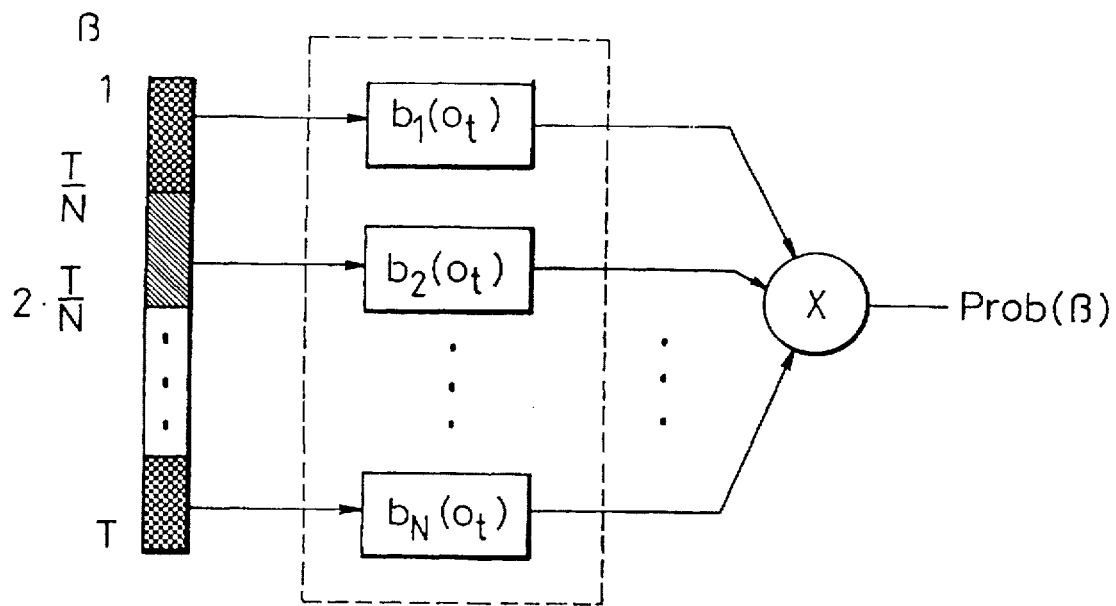
FIG. 3 illustrates how to recognize the mono-syllable in accordance with the "Segmental Probability Models" shown in FIG. 2.

FIG. 3 illustrates the recognition process in accordance with the "Segmental Probability Models". An unknown syllable $\beta$, after being entered into the computer, is also equally divided into N segments. The feature vectors or the frames in a segment are respectively applied to the M Mixtures of Gaussian distribution equations of said segment for the "Segmental Probability Model" of a particular syllable to calculate the probability in accordance with the "Segmental Probability Model". The product of the probabilities for all the N segments represents the probability of the unknown syllable $\beta$ relative to the particular syllable in accordance with its "Segmental Probability Model". All the 408 basic mono-syllables shall be trained to have such "Segmental Probability Models" in advance. When an unknown syllable $\beta$ is entered, this syllable will be used to calculate the probabilities relative to the "Segmental Probability Models" of each of the 408 basic mono-syllables. The basic mono-syllable corresponding to the "Segmental Probability Model" with the highest probability will be the result of the recognition. "Segmental Probability Model" with the highest probability will be the result of the recognition.

The "tone recognition" portion of the "acoustic processing section" as shown in FIG. 1 will be described now. Basically, the "tone recognition" portion is used to recognize the correct tone of the syllable (total five choices including four different lexical tones and the neutral tone in Mandarin) . The method employed is still the above-mentioned "Segmental Probability Models". That is, five "Segmental Probability Models" are established for the five different tones. The probabilities of an unknown syllable relative to these five models will be calculated respectively. The tone corresponding to the model with highest probability is the result of the recognition. The difference is, however, the selected feature parameters shall now include the pitch frequency (which determines the pitch of the voice, and is actually the vibration frequency of vocal cords that can be calculated from a speech signal), instantaneous energy and syllable duration. Please note that methods for recognition of different tones have been disclosed by other inventions, but nobody used "Segmental Probability Models" to recognize different tones. The present invention has proven that it is simple and convenient to use "Segmental Probability Models" in both the recognition of basic mono-syllables and tones. Also, instantaneous energy and syllable duration are used to facilitate the recognition of neutral tone.

Figure 4:
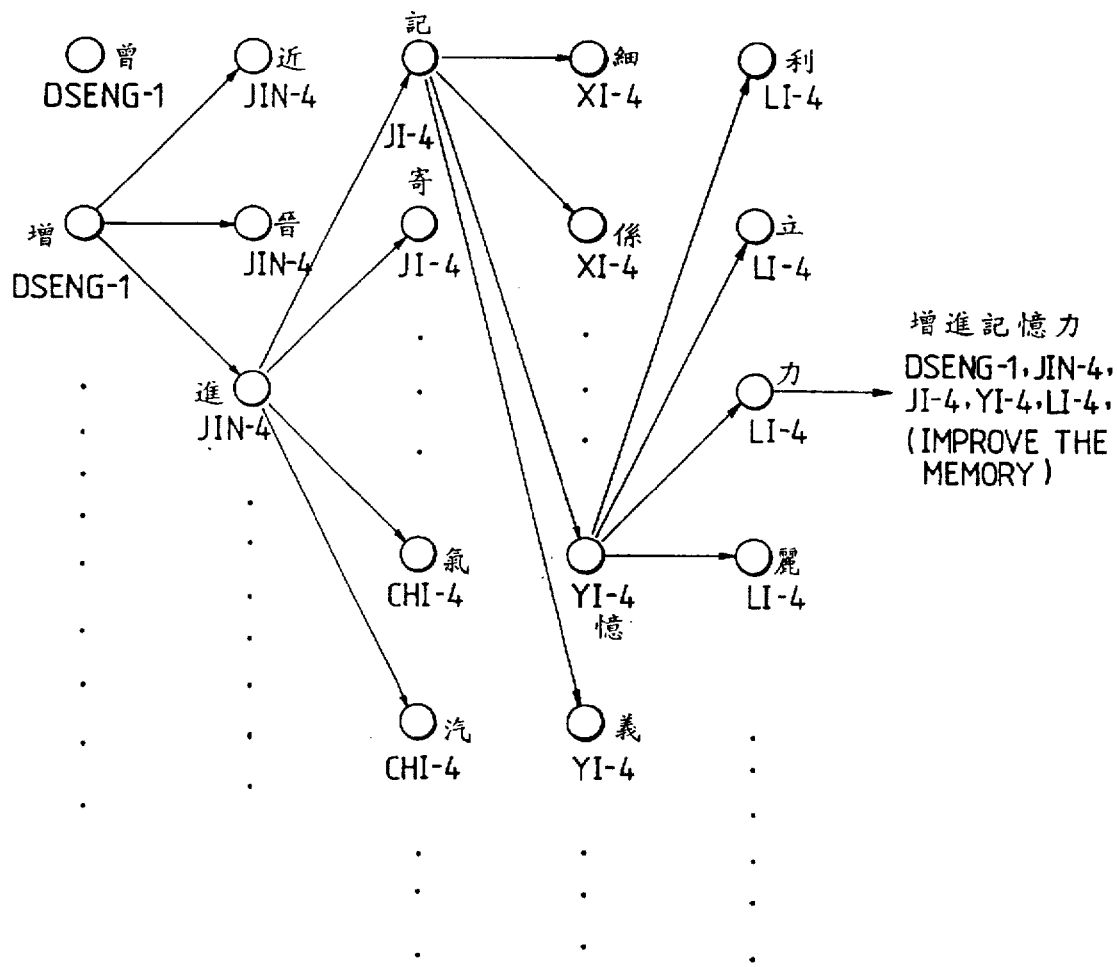
FIG. 4 illustrates the "Character-based Chinese Language Models" in accordance with the cited patent.

The principle of the "linguistic decoding section" shown in FIG. 1 will be described now. The method used in the cited patent is shown in FIG. 4. When a series of recognized syllables (in phonetic symbols) is provided by the acoustic processing section, all possible homonym characters for the given syllables are generated by the "Character Hypothesis Formation" process. This is done by simply looking up a dictionary stored in the machine. Please note that sometimes some syllables are too confusing to be decided in the acoustic processing section. For example, the "chi-4" and "ji-4" are very similar. If the acoustic processing section can not determine the exact answer, both choices will be provided to the "Character Hypothesis Formation" process, and the homonym characters for all possible choices of syllables will be listed and transferred to the "Markov Chinese Language Model" to calculate the corresponding probabilities.

The training method of the "Markov Chinese Language Models" (FIG. 4) disclosed in the cited patent is as follows: For instance, if 20,000,000 characters of newspaper text (in the format of a computer file) are entered into the computer as the "training text", the program in the computer will count the occurrence frequencies for all characters and words. For example, "中" (jueng-1) is present for 150 times, "中央" (jueng-1 yang-1) is present for 32 times, "中國" (Jueng-1 guo-2) is present for 28 times, . . . etc. The probabilities for the occurrence of each character and the possible other characters adjacent to said character will be calculated by the computer program based on a particular formula. When the acoustic processing section produces a sequence of recognized syllables (phonetic symbols), the program of the Language Model has formulas to calculate the probability for linking each possible set of homonym characters into a sentence. For example, FIG. 4 shows that each of "dseng-1" and "jin-4" comprises many homonym characters respectively. But "增進 (improve) " has the most possible combinations of homonym characters for the above two syllables. Similarly, while each of "ji-4" or "chi-4" and "yi-4" comprises many homonym characters, but "記憶 (ji-4 yi-4; memory)" has the most possible combinations of homonym characters for the above two syllables. When all syllables shown in FIG. 4 are entered as "dseng-1 jing-4 ji-4 yi-4 li-4", the probabilities of above five syllables with respect to "增進記憶力 (improve the memory)", "曾進幾億里 (this combination is meaningless in Chinese)" and other possible combinations are calculated respectively. Finally, the highest probability is formed for the character sequence "增進記憶力", and the corresponding sentence will be chosen as output. In other examples, characters of Chinese textbooks for primary schools or text printed in newspapers or magazines (already in the format of computer file) are entered into the computer as the "training texts". The computer will calculate the occurrence frequency of each character to appear adjacent to other character(s) in such texts to establish the Language Models corresponding to the primary school textbooks and newspapers or magazines respectively. In fact, every user may use the most suitable "training texts" to train and establish his own Language Model. For example, after a business reporter has used the business news in the newspapers to train his machine, the machine will be adaptive to the input of business news. After a writer has used his previous works to train the machine, the machine will be adaptive to the wording and sentence style of the writer, with higher correct recognition rate during dictation to the machine.

The above-mentioned "Chinese Language Model" can advantageously correct some of the errors generated by the acoustic processing section. If two mono-syllables are very confusing, the acoustic processing section can send both mono-syllables to the "Chinese Language Model" for further selection. For example, FIG. 4 shows that "chi-4" ranks as the highest probability and "ji-4" ranks as the second probability, therefore, the resultant recognition output should be "chi-4" at this stage. However, since the above two probabilities are very close, the selection between "qi-4" and "ji-4" can be temporarily pending and these two syllables will be sent to the following Language Model to calculate the probabilities with respect to context. Because the next syllable will be one of "yi-4" and "shi-4", a much higher probability of "記憶" relative to that of "气 事" will be calculated by the Language Model". Therefore, "記憶" will be finally selected to correct the possible error. This process is very similar to the situation when human beings listen to Mandarin. We human beings will automatically determine the correct sentence for some confusing pronunciations in accordance with the context.

The number of characters and vocabulary that can be recognized by the dictation machine depend on the built-in dictionary as well as the characters and vocabulary contained in the "training texts". Once the dictionary and training texts contain more characters, the number of recognizable characters can be increased.

Figure 5A:
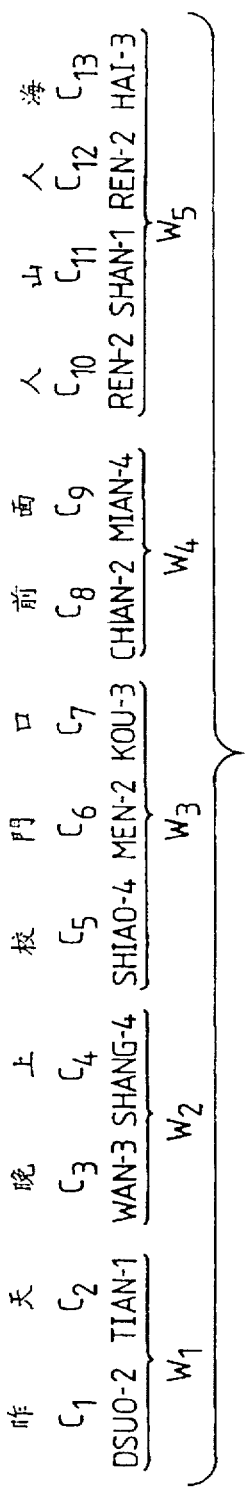
FIG. 5 illustrates the "Word-class-based Chinese Language Models" in accordance with the present invention.

The "Chinese Language Model" described above is the disclosure of the cited patent. This "Chinese Language Model" is actually based on "character", that is, the probabilities of each "character" to appear adjacent to other "characters" is the major criterion for selection among characters. However, a Chinese sentence is actually composed by "words", each of which comprises one or more "characters". In fact, instead of a "character", the Chinese people usually use a "word" as the basic building unit to compose a sentence. Referring to the exemplary sentence shown in FIG. 5(a), this sentence should be considered as the composition of five "words" rather than the composition of thirteen "characters". Following from this, better results can be obtained from the word-based "Chinese Language Models" that calculate the probabilities of a certain word to appear adjacent to other words as the criterion for selection among words. This is the basic concept of the present invention that replaces the character-based "Chinese Language Models" by word-based "Chinese Language Models". Experiments have proved that this concept is correct and will provide better results.

Figure 5B:
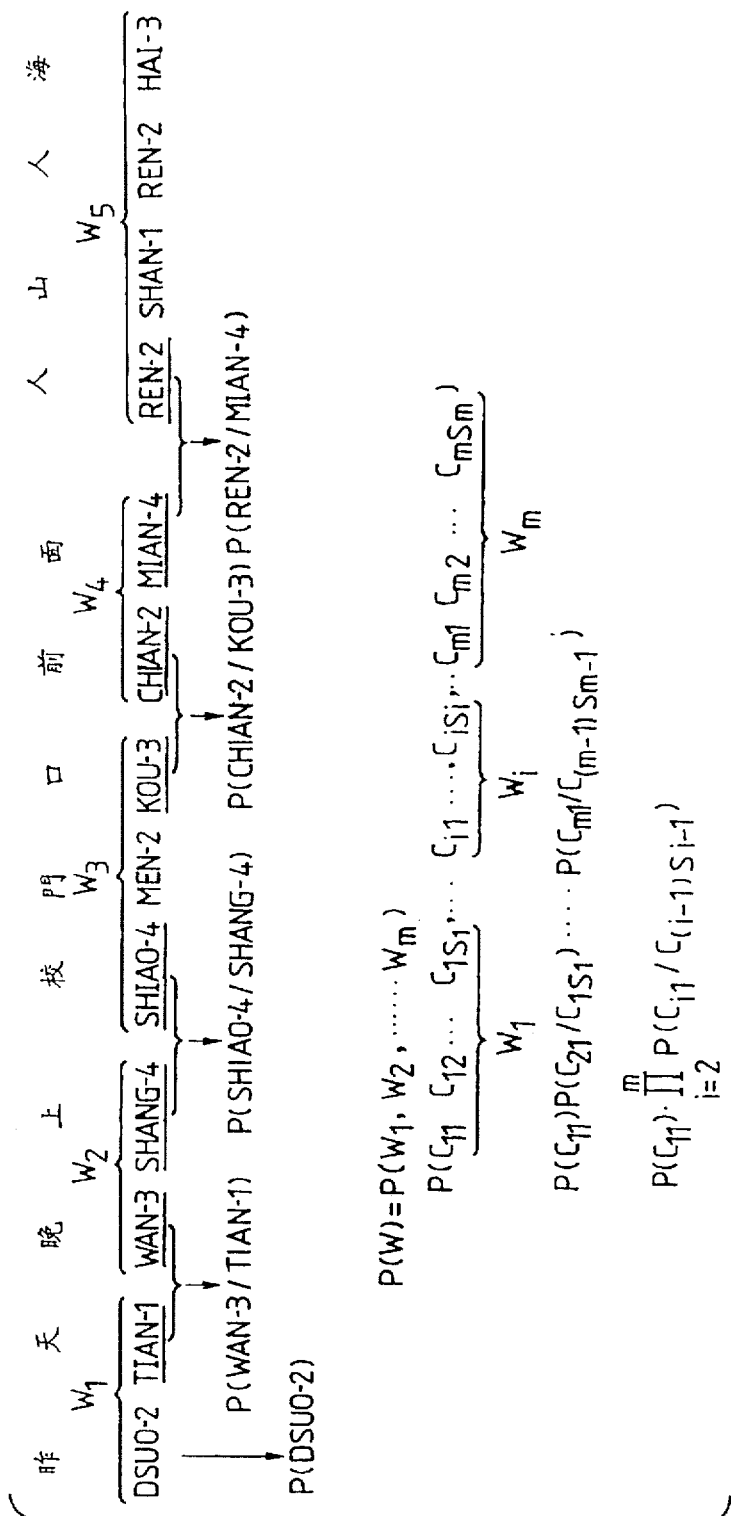

However, the "Chinese Language Models" based on "words" is much more difficult than that based on "characters" because the number of "frequently used words" is significantly larger than the number of "frequently used characters". For example, if it is based on "character", 10,000 frequently used characters will result in 10,000×10,000 combinations with respect to the appearance of any character adjacent to any other character, thus requiring 10,000×10,000 corresponding probabilities. If it is based on "words", more than 160,000 frequently used words will result in 160,000×160,000 combinations with respect to the appearance of any word adjacent to one of other words, thus requiring 160,000×160,000 corresponding probabilities which is beyond technical feasibility. To solve this problem, a "Word-class-based Chinese Language Models" has been developed in accordance with the present invention. One exemplary sentence is shown in FIG. 5 (b). The sentence "昨天晚上校門口前面人山人海" (dsuo-2 tian-1 wan-3 shang-4 shiao-2 men-2 kou-3 chian-2 mian-4 ren-2 shan-1 ren-2 hai-3, last night people crowded in front of the school gate) comprises 5 words: "昨天" (dsuo-2 tian-1, yesterday), "晚上" (wan-3 shang-4, night), "校門口" (shiao-2 men-2 kou-3, school gate), "前面" (chian-2 mian-4, in front of) and "人山人海" (ren-2 shan-1 ren-2 hai-3, people crowded). The conventional method will calculate the probability of co-occurrence of word pairs. That is, the probabilities of "昨天 (yesterday)" associated with "晚上 (night)", "晚上 (night)" associated with "校門口 (school gate)", "校門口 (school gate)" associated with "前面 (in front of)", and "前面 (in front of)" associated with "人山人海 (people crowed)" should be calculated. However, the method of "Word-class-based Chinese Language Models" in accordance with the present invention will only calculate the probabilities of the beginning or ending character in any word associated with the ending or beginning character in one of other words. For example, only the probabilities of "天" associated with "晚", "上" associated with "明天", "口" associated with "前", and "面" associated with "人" are calculated. This is because all words having "天" as the ending character can be grouped into a word class which includes "昨天 (yesterday)", "明天 (tomorrow)" and so on. Similarly, all words having "晚 (evening)" as the beginning character can also be grouped into another word class which includes "晚上 (night)", "晚自習 (evening class)" and so on. The associativity of any word located in said one word class with any word located in said another word class can thus be represented by the associativity of the ending character such as "天 (day)" with the beginning character such as "晚 (evening)" For example, both "今天晚上 (tonight)" and "明天晚自習 tomorrow's evening class)" can be represented by the same associativity of "天 (day)" with "晚 (evening)". Therefore, the probability of the associativity of "天 (day)" with "晚 (evening)" actually represents the possibility to associate one word class with another word class, instead class with another word class, instead of the unique associativity of "今天 (today)" with "晚上 (night)". According to this concept in accordance with the present invention, the associativity of any "ending character" with one of other "beginning characters", will still generate 10,000×10,000 combinations (assuming there are 10,000 frequently-used characters), requiring 10,000×10,000 corresponding probabilities which is the same as the Language Model based on character. Experiments have proven that much better results can be effected from the method in accordance with the present invention. In addition, the parameter of "word utilization frequency" is easily included in the word-class-based "Chinese Language Models" to further increase the correct recognition rate by selecting the most frequently used words with higher priority. "Segmental Probability Models" and "Word-class-based Chinese Language Models" are the fundamental techniques of the present invention described. In accordance with these two fundamental techniques of the present invention, the amount of required calculations is dramatically reduced, while the correct recognition rate is significantly increased. The "Intelligent Learning Techniques" developed in accordance with the present invention, which can further equip the dictation machine with "intelligence" that can "learn" if required, will now be described.

The first learning technique is automatic learning for the user's voice. Because the new machine has been trained with the voices of many persons, a 55% average correct recognition rate has been ensured before the new user trains the machine. A set of "phonetically balanced learning sentences" is designed for the learning process in accordance with the present invention. Once the new user has pronounced the first subset of 24 sentences of the "learning sentences" in the first training stage (it will take about 5 minutes to read a total of 188 characters), the machine will immediately complete the learning of the user's voice with the correct recognition rate increased to 82%. This is because these 188 characters already include all the phonemic variations of 22 "initials" (the initial consonants), 38 "finals" (the vowels or diphthongs plus possible medials or ending) and more than one hundred transitions between the "initials" and the "finals". For example, once the mono-syllable "shu" has be pronounced, the machine can also learn the "initials" in the mono-syllables such as "shuo" and "shuai" as well as the "finals" in the syllables such as "bu" and "mu" at the same time. The machine can thus learn all possible pronunciations from these 24 sentences. Also, the more frequently used pronunciations will have more chances to be present in these 24 sentences to result in more correct training. This is the reason that the machine can complete initial learning from these 24 sentences. At a second training stage, if a new user is willing to continue to pronounce another 24 training sentences (it will take an additional 4 minutes for a total of 149 characters), the correct recognition rate can be further increased to about 85%. This is because these 24 sentences have already included the most frequently used 200 basic mono-syllables, in such a manner that the most frequently used mono-syllables will have more training utterances to result in better training. For example, a frequently used syllable "ta-1", that has been trained by means of the "initial" of "tao-1" and the "final" of "ba-1" in the first subset of 24 sentences in the first training stage, may not have been well trained during the first stage. However, the syllable "ta1" will be present several times during the second subset of learning sentences so as to result in better training and a higher correct recognition rate. At a third training stage, similarly, if the new user is willing to pronounce another 57 sentences (it will take an additional 13 minutes for a total of 516 characters), the correct recognition rate can be further increased to about 88%. This is because these 57 sentences have included all the 408 basic mono-syllables of Mandarin (the tones are not considered at this stage), in such a manner that frequently used mono-syllables will have more of a chance to be present and training will be achieved with higher accuracy. At the fourth training stage, if the new user is willing to pronounce another 280 sentences (it will take another additional 65 minutes for a total of 2501 characters), the correct recognition rate can be further increased to about 92%. This is because these 280 sentences have included all the 1300 mono-syllables including different tones (for example, "ba" actually includes 5 variations: "ba-1", "ba-2", "ba-3", "ba-4" and "ba-5"), in such a manner that all mono-syllables with allowed tonal variations will be present and the frequently used mono-syllables will have more of a chance to be present and training will be achieved with higher accuracy.

The second learning technique is automatic on-line learning of the user's voice by the machine in real-time. In fact, it is not necessary for the user to start using the machine after the above-mentioned four stages have all been completed. After the first stage of training (188 characters in a total of 24 sentences) has been completed, the user can start to use the machine at any time at the price of a lower initial correct recognition rate. Regardless of whether the machine is trained with the learning sentences described above or is in practical use, "on-line" real-time learning can always be immediately carried out at any time by the machine if instructed and the errors are corrected by the user. In other words, all recognized speech signals can always be learned by the machine during operation. Therefore, if the machine is used and the learning function is operating, the correct recognition rate can be continuously increased to about 95% –97%. That is, one error requiring correction for every 20–35 characters.

The third learning technique is automatic on-line learning of the environment noise. Every user's environment will generate inevitable noise with different characteristics which will degrade the recognition rate. In the process of "on-line learning of a user's voice" described above, the characteristics of the environmental noise can, in fact, also be automatically learned and the machine automatically adapted to such noise. After a period of learning time, the machine will work well under the given environmental noise. In fact, the above three learning functions are technically performed with identical principles. Voices from different speakers will be firstly used to train the "Segmental Probability Models" of every mono-syllable in Mandarin. Because voices from different speakers will differ, the same mono-syllable pronounced by these speakers will also differ significantly. In this "Segmental Probability Models" with multiple speakers, a larger amount of Mixtures of Gaussian Probabilities is required to include different feature parameters generated by different speakers pronouncing the same mono-syllable. When a new user pronounces the mono-syllables (including its "initial" and "final" parts, also used by the "initial" and "final" parts of many other mono-syllables as long as they share the same "initial" or "final" parts), an algorithm will be used to select several Mixtures of Gaussian Probabilities in the "Segmental Probability Models" of the mono-syllable, as well as of many other mono-syllables as long as they share the same "initial" or "final" parts with this mono-syllable, with feature parameters similar to those of the new user, from the group of Mixtures of Gaussian Probabilities in the "Segmental Probability Models" with multiple speakers. Other Mixtures of Gaussian Probabilities will be de-emphasized. The built-in "Segmental Probability Models" is now adapted to become the new user's "Segmental Probability Models". If the new user's voice is continuously entered, the new voice can be included to calculate a new Mixture of Gaussian Probabilities, and so on. When more features from the new user's voice are included in the "Segmental Probability Models", the new user's voice can be better described by the "Segmental Probability Models". If environmental noise exists in the user's voice, the noise mixed with the new user's voice will be entered. Therefore, the noise will also be averaged into the Models, and the resultant Mixtures of Gaussian Probabilities will automatically include the characteristic features of the environmental noise as the background of the voice. The trained "Segmental Probability Models" will thus be adapted to the environmental noise with such features included in the parameters. Please note that the mathematical computation of the "Segmental Probability Models" is simple enough for fast calculation and is therefore easily implemented for "on-line" real-time learning. In other words, when the machine is being used by the user, the voice and the environmental noise is immediately averaged into the Models. The new Models will then be used to recognize the next pronunciation. The effect of "real-time on-line learning" can thus be quick and significant.

The fourth learning technique is automatic on-line learning for the user's special words, wording and sentence style. Basically, every user has his own special words, wording and sentence style. In fact, many errors are generated because the machine does not know the user's such special words, wording and sentence styles. While the user is using the machine and correcting errors on line, the machine can immediately learn the special words, wording and sentence styles present in the sentences entered by user. That is, not only the new special words can be automatically added into the lexicon of the machine, but the important parameters such as word/word-class occurrence frequencies and the probabilities of associativity between the corresponding word classes in the Language Model will be immediately updated, and the Model will be automatically adjusted in real-time. The machine has thus learned the user's special words, wording and sentence style, and so on.

The fifth learning technique is the short-term memory retention. If a block of text dealing with a particular topic is being entered, some specific words, wording and sentence styles may be repeatedly present. Some specific information including word/word-class occurrence frequencies and probabilities of associativity between two word classes can be stored in a short-term cache memory by the machine for use in the immediate future. Therefore, the correct recognition rate will be improved significantly when more text for the same topic is entered. If the input text is changed to another topic, the information in the short-term cache memory can be completely cleared.

Figure 6:
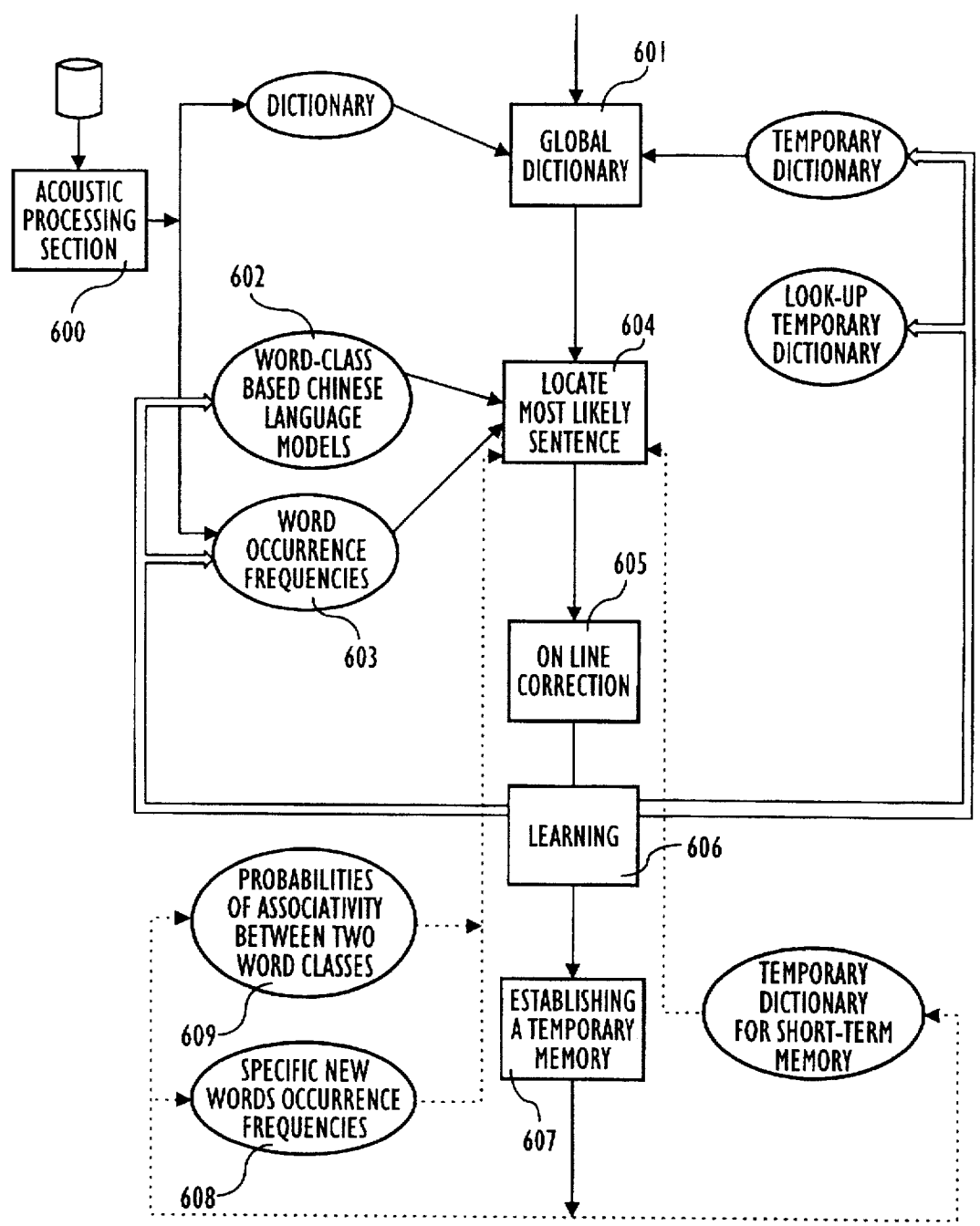
FIG. 6 illustrates a flow chart showing the speech-recognition method using the words as the recognition units in accordance with the present invention.

The fourth and fifth learning techniques are shown in FIG. 6 in which the recognition unit is a "word". When the recognized series of syllables is provided by the acoustic processing section (step 600), all possible words are generated by looking up a global dictionary pre-stored in the computer (step 601). The "Word-class-based Chinese Language Models" (step 602) and "Word occurrence frequencies" (step 603) are then used to locate the most likely sentence for output (step 604). The user can make an on-line correction (step 605) for immediate learning by the machine (step 606). Then the new words are immediately stored into the dictionary and the word/word class occurrence frequencies and the probabilities or associativity between two word classes under the Markov Model shall be updated accordingly. The process also include the establishment of a temporary short-term cache memory (step 607) to store special new words, the word/word-class occurrence frequencies, and the probabilities of associativity between two word classes. After the input of the texts has been completed, the user may determine whether the temporary short-term memory and such new information should be included in the global dictionary and relevant language model parameters, or whether the short-term memory should be cleared. Because some particular words or sentence styles are repetitively present in a text dealing with a specific topic, if the learning is based only on the global dictionary and global Language Model, the learning effect will not be significant. This is because these particular words and sentence styles only have a higher number of occurrences in this text, they can not greatly affect the global word occurrence frequencies and probability of associativity between two word classes, and so on. This is why an additional short-term memory is provided in accordance with the present invention, as shown in FIG. 6. The specific new words, word occurrence frequencies (step 608) and probabilities of associativity between two word classes calculated for this text (step 609) will be stored in this short-term memory. When new sentences are entered into the machine, the machine will first access the short-term memory. If the short-term memory does not include the information, then the machine will access the global language model and global dictionary. The specific new words and sentence styles of the text subject will thus be learned immediately, and the correct recognition rate will be increased when more sentences concerning the same topic are entered. Because the contents in the short-term memory can be completely cleared if another text dealing a with different topic is entered, the next input will thus not be interfered with by the previous input.

Figure 7:
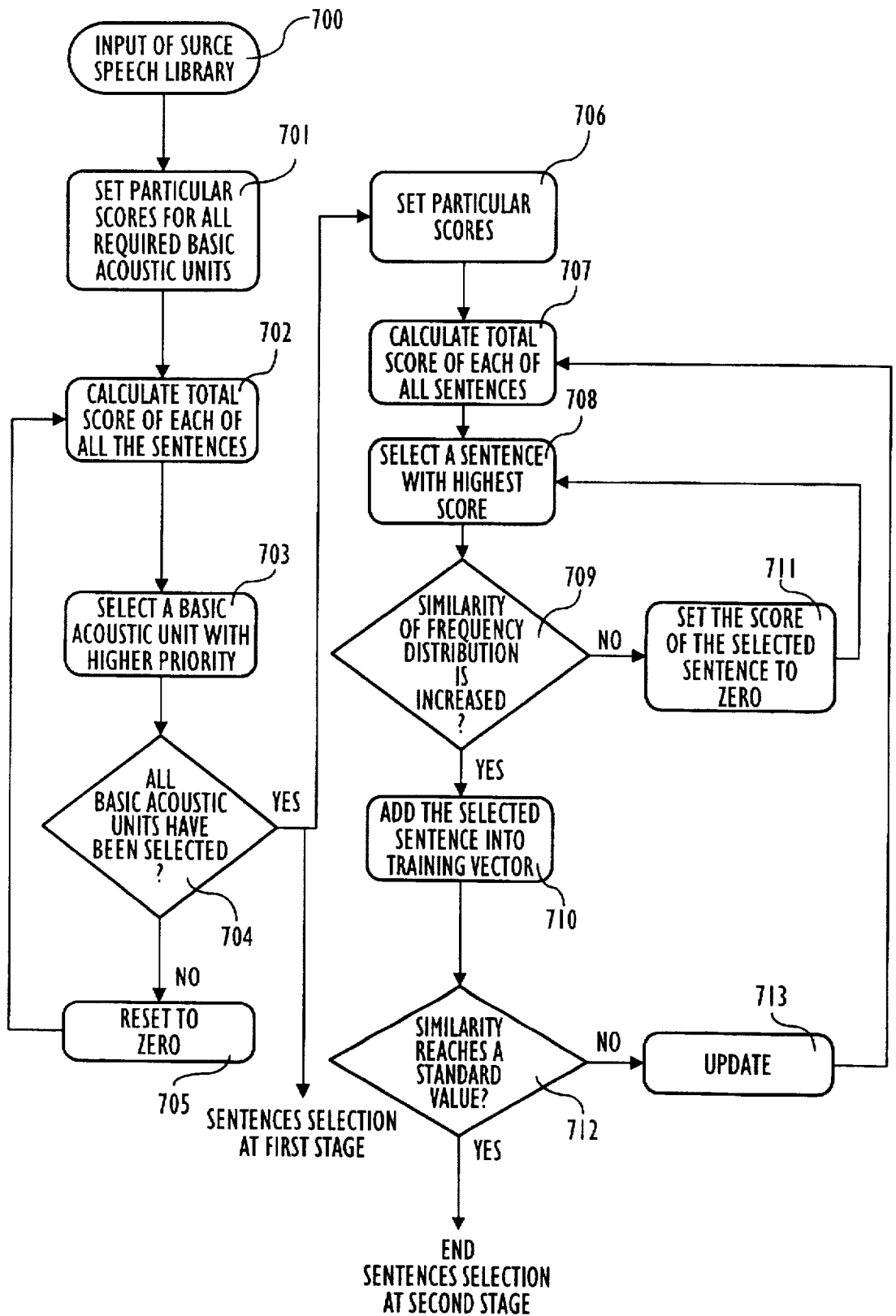
FIG. 7 illustrates a flow chart for automatic selection of "Learning Sentences" by the computer in accordance with the present invention.

Some other techniques in accordance with the present invention will be described now. One of them is the technique to automatically select the "learning sentences". As described before, a specific set of "learning sentences" is designed in accordance with the present invention. The new user can train the machine to be adapted to his voice by simply pronouncing the minimum number of sentences, which is the set of "learning sentences". This specific set of "learning sentences" is actually selected by the computer from a collection of text files. FIG. 7 is the flow chart for automatic selection of "Learning Sentences" by the computer. First, the sentences are input from a source speech library (step 700). The selection procedures are divided into two stages. The first stage is for setting some particular scores for all required basic acoustic units (step 701) (including "initials", "finals"; transitions between "initial" and "final", mono-syllables, basic mono-syllables, and so on). Then the total score of each of all the sentences in a text file can be calculated in accordance with the individual scores of the basic acoustic units included in each sentence (step 702). A sentence including more different basic acoustic units will get a higher total score and will be selected with a higher priority (step 703). In other words, other sentences including these basic acoustic units will be selected with much lower priority. Once all the basic acoustic units included in a sentence have been selected (step 704) the method inputs the second selection stage. Otherwise, the scores of each of the basic acoustic units included in the sentence will be reset to zero (step 705) and the selection returns to step 702.

The second stage is for setting particular scores for the required basic acoustic units according to the frequency distribution of the basic acoustic units in the source speech library as well as the training vector comprising selected sentences (step 706). Then the total score of each of all the sentences in a text file can be calculated in accordance with the individual scores of the basic acoustic units included in each sentence (step 707). The sentence with the highest score is selected (step 708) and checked if the similarity of the frequency distribution is increased by selecting such a sentence (step 709). It is required that the most frequently used basic acoustic units should appear more times in the "training sentences", so more training utterances will improve the recognition accuracy. Therefore, a parameter is used to describe the similarity between the occurrence frequency distribution of each basic acoustic unit in the selected "learning sentences" and that in the real text file. This parameter can be used to select additional "learning sentences" so that the desired occurrence frequency distribution of each basic acoustic unit can be achieved and therefore frequently used basic acoustic units will be recognized very accurately. If the answer in step 709 is yes, the selected sentence is added into the training vector (step 710). Otherwise, the score of the selected sentence is set to zero (step 711) and the flow returns to step 708. After the selected sentence is added into the training vector, it is checked to determine if the similarity of the selected sentence reaches a standard value (step 712). If the answer is yes, then the selected sentence is the correct one and output. Otherwise, update the scores of all basic acoustic units included in the added selected sentence (step 713). The step returns to step 707.

Another technique is the "Segment Sharing Method" under the "Segmental Probability Models". As described before, After a new user has pronounced a mono-syllable such as "shu-1", this mono-syllable will be divided into N segments. In fact, the first several segments describe the acoustic features of the "initial" "sh", while the following several segments are descriptive of "final" "u". Therefore, the first several segments can be used to train the "initials" of not only the mono-syllable "shu-1", but also other mono-syllables such as "shuo-1" and "shuei-4" at the same time, as long as these mono-syllables share the same "initial" "sh". Similarly, the following several segments can be used to train the "finals" of not only the mono-syllable "shu-1", but also other mono-syllables such as "bu-1" and "mu-1" at the same time, as long as these mono-syllables share the same "final" "u". In this way, only a minimum number of training utterances will be needed for the machine to accept the voice of a new user. In addition, the "initials" described herein shall be classified in accordance with each of the beginning phonemes of the "finals" following thereof. For example, the "initials" in "shu-1", "shuo-1" and "shuei-4" are considered the same with a right context dependency of "u" because the beginning phoneme of the "finals" "uo" (of the mono-syllable "shuo-1") and "uei" (of the mono-syllable "shuei-4") are all "u". However, the "initials" in mono-syllable "sha-1", "shau-1" and "shan-1" are considered a different "initial" with a right context dependency of "a". This is the basic principle of the "Probability Segment Sharing Method" under the "Segmental Probability Models".

Another technique is the "Dynamic Dictionary Structure". The vocabulary contained in the dictionary is so large that it takes a substantial amount of time to look up words, especially mono-character words and bi-character words. To solve this problem, a "Dynamic Dictionary Structure" is designed in accordance with the present invention. The frequently used mono-character words and bi-character words are selected along with other poly-character words (that is, words each comprising three or more characters) to constitute a "Frequently Used Dictionary". The remaining words (that is, the remaining mono-character words and bi-character words) are then included in a "Less Frequently Used Dictionary". During operation, the machine will first look up the "Frequently Used Dictionary". If a satisfactory sentence can not be composed because no suitable word can be located in the "Frequently Used Dictionary", then the "Less Frequently Used Dictionary" will be searched. The selected words from the "Less Frequently Used Dictionary", if correct, will be moved to the "Frequently used Dictionary after the learning process. Some of the words in the "Frequently Used Dictionary", if not actually frequently used by the user, may also be moved to the "Less Frequently Used Dictionary". Based on this structure, the access time for searching the dictionary can be reduced to about 1/10 of the time required to search a Dictionary having a conventional structure.

Figure 8:
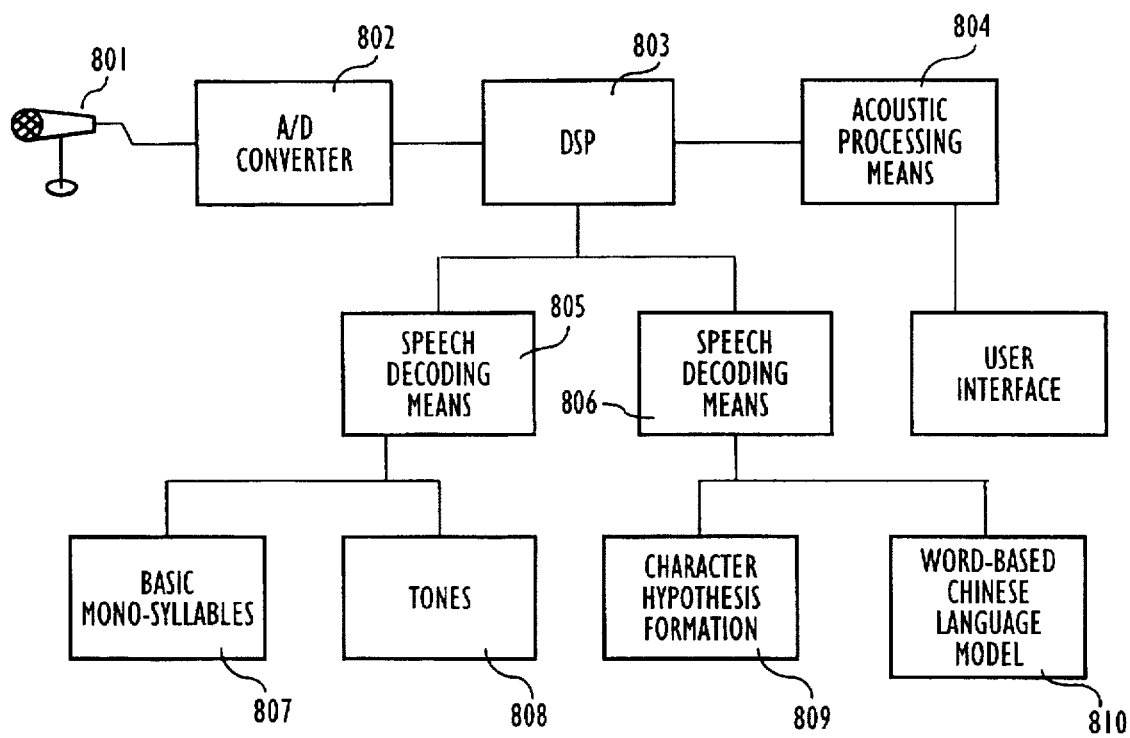
FIG. 8 illustrate a preferred embodiment of a dictation machine in accordance with the present invention.

FIG. 8 illustrates a preferred embodiment of a dictation machine in accordance with the present invention. The speech signals of the user are input into via a microphone 801 and are entered to the DSP (digital signal processing) board 803 for processing by means of an acoustic processing means 804 and a speech decoding means 805 through an analog-to-digital converter 802. Then the speech signals after being processed will be recognized by the dictation machine 803 of the present invention. As mentioned in FIG. 1, the acoustic processing means 804 is used to recognize the basic mono-syllables 807 and the tones 808 of the input speech and the speech decoding means 806 to decode the speech by means of character hypothesis formation and word-based Chinese language Model techniques 809 and 810. The speech signals will then be translated into Chinese characters and displayed on the screen of the personal computer. In accordance with the present inventions the dictation machine can be implemented with a typical personal computer. All disclosed techniques described above can be implemented through software which can be stored in the memory device of an Ariel 96002D digital signal processing (DSP) board, including the "Segmental Probability Models" comprising all basic mono-syllables and tones, "Word-class-based Chinese Language Models" and all intelligent learning techniques described above. All necessary calculations are carried out by the Motorolla digital Signal Processor (DSP) 9600 chip on the DSP board. In fact, many DSP chips and DSP boards are available in the market. They can all be used. The DSP chip and DSP board employed in the preferred embodiment of the present invention is just the one that has been practiced by the applicant at National Taiwan University.

The above embodiment is taken as an illustration of the principles of the present invention, not as limitations to the present invention. It will be apparent to the skilled persons that many changes may be made to the details of the present invention described herein without departing from the spirit and underlying principles thereof. The scope of the present invention should, therefore, be defined only by the appended claims.

I claim:

1. A Mandarin speech input method for directly translating a plurality of spoken words of Mandarin speech into corresponding Chinese characters, comprising steps of:

acoustic processing of the Mandarin speech, the acoustic processing step employing "Segmental Probability Models" to calculate probabilities of each of a plurality of mono-syllables in the Mandarin speech input and each of a plurality of tones thereof for further recognition; and linguistic decoding of the plurality of mono-syllables recognized by the acoustic processing step, the linguistic decoding step employing "Word-class-based Markov Chinese Language Models" to locate the corresponding Chinese characters for a series of the plurality of mono-syllables.

2. The Mandarin speech input method of claim 1, wherein the "Word-class-based Markov Chinese Language Models" are based on "Chinese word classes", the "Word-class-based Markov Chinese Language Models" using beginning characters and ending characters to calculate the probabilities.

3. The Mandarin speech input method of claim 2, wherein the "Word-class-based Markov Chinese Language Models" divide homonyms corresponding to the series of the plurality of mono-syllables into a plurality of words and determine exact characters in each of the plurality of mono-syllables by comparing probabilities of an associativity between each of the ending characters and each of the beginning characters that represent each preceding word and each following word respectively and by comparing occurrence frequencies of each of the plurality of words.

4. The Mandarin speech input method of claim 1, wherein a training algorithm of the "Segmental Probability Models" comprises:

dividing one of the plurality of mono-syllables having T frames of duration into a plurality of equal N segments, each of the plurality of equal N segments including a plurality of equal T/N frames;

pronouncing the one of the plurality of mono-syllables by a user for L times to constitute L utterances of the one of the plurality of mono-syllables, and dividing each of the L utterances, which may be different in duration, into the plurality of equal N segments;

using a first plurality of combined feature vectors in a first segment of the plurality of equal N segments to train a state of the first segment of the plurality of equal N segments;

using a second plurality of combined feature vectors in each successive segment of the plurality of equal N segments to train a state of each of the successive segments of the plurality of equal N segments, and repeating the step of using the plurality of combined feature vectors in each successive segment until all N states of the plurality of equal N segments have been trained;

describing each one of the N states with M Mixtures of Gaussian Probabilities, and training a plurality of parameters of each of the Gaussian Probabilities with the first plurality of combined feature vectors and the second plurality of combined feature vectors in the T frames; and establishing the "Segmental Probability Models" of the one of the plurality of mono-syllables with the N states.

5. The Mandarin speech input method of claim 4, wherein the training algorithm of the "Segmental Probability Models" further comprises a "Segment Sharing" training algorithm comprising:

dividing the input one of the plurality of mono-syllables into N segments, in which a first plurality of the N segments, describe an "initial" of the one of the plurality of mono-syllables and a following plurality of the N segments describe a "final" of the one of the plurality of mono-syllables; and training states of a plurality of particular segments of a plurality of other mono-syllables, with a common "initial" or a common "final" that corresponds to the "initial" or the "final", by means of the first plurality of the N segments or the following plurality of the N segments, using the L utterances of the one of the plurality of mono-syllables.

6. The Mandarin speech input method of claim 4, wherein a recognition algorithm of the "Segmental Probability Models" comprises:

training the "Segmental Probability Models" of all 408 basic mono-syllables;

dividing an unknown input mono-syllable into a plurality of N segments;

applying the plurality of combined feature vectors of each of the T/N frames in each of the plurality of N segments to the M Mixtures of the Gaussian Probabilities representing one segment of one of the 408 basic mono-syllables respectively under the "Segmental Probability Models" to calculate corresponding probabilities;

multiplying the corresponding probabilities of each of the plurality of N segments to get a probability of the unknown mono-syllable with respect to the one of the 408 basic mono-syllables under the "Segmental Probability Models"; and calculating probabilities of the unknown mono-syllable with respect to each of the 408 basic mono-syllables in a way similar to the multiplying step, and determining a recognition result by selecting one of the 408 basic mono-syllables corresponding to a highest probability under the "Segmental Probability Models".

7. The Mandarin speech input method of claim 1, wherein the "Word-class-based Chinese Language Models" can be used to correct some errors of the plurality of mono-syllables provided by the acoustic processing step.

8. A learning method of a Mandarin speech recognition system for quickly adapting to a voice of a new user to recognize a Mandarin speech input of the new user, the learning method training, in advance, each mono-syllable of a plurality of mono-syllables as "Segmental Probability Models" including feature parameters of each of the mono-syllables of the plurality of mono-syllables pronounced by different users, comprising:

training a plurality of pronunciations by many speakers with respect to one mono-syllable of the plurality of mono-syllables as the "Segmental Probability Models", in which a plurality of Mixtures of Gaussian Probabilities is required to describe each state of the one mono-syllable in consideration of different feature parameters of the many speakers;

pronouncing the one mono-syllable by the new user and establishing the "Segmental Probability Models" of the new user by selecting a plurality of Mixtures of Gaussian Probabilities having feature parameters close to the feature parameters of the new user from the plurality of Mixtures of Gaussian Probabilities under the "Segmental Probability Models" for the many speakers and by de-emphasizing other unnecessary Mixtures of Gaussian Probabilities;

calculating new Mixtures of Gaussian Probabilities and updating new "Segmental Probability Models" by averaging feature vectors of a plurality of segments of a new pronunciation of the one mono-syllable when the new user continuously pronounces the one mono-syllable; and repeating the calculating step so that a ratio of the Mandarin speech of the new user in the new "Segmental Probability Models" will be gradually increased to result in the new "Segmental Probability Models" that can better describe the Mandarin speech of the new user.

9. The learning method of claim 8, further comprising:

correcting recognition errors generated by the Mandarin speech recognition system on an on-line basis by means of a screen display; and repeating the calculating step and the repeating step immediately so that the Mandarin speech recognition system can learn new speech and can use the new "Segmental Probability Models" in a next recognition to continuously increase a correct recognition rate.

10. A Mandarin dictation machine for recognizing Mandarin speech, comprising:

an analog-to-digital converter with a filter for filtering and converting speech input signals into digital signals;

a computer coupled with a digital signal processing board for receiving and processing the digital signals provided by the analog-to-digital converter;

a pitch frequency detector;

a feature abstraction apparatus, the feature abstraction apparatus and the pitch frequency detector both being coupled to the computer for detecting and calculating a pitch frequency and other feature parameters of the digital signals received by the computer;

Segmental Probability Models processing means coupled with a Mixed Gaussian Probabilities processing means, after calculating an endpoint of each of a plurality of mono-syllables, for recognizing a basic mono-syllable of the plurality of mono-syllables and a tone thereof;

word-class-based Markov Chinese Language Models processing means, which calculates probabilities with characters, for calculating probabilities of all possible homonym characters of each of the plurality of mono-syllables input and transferring recognized results to the computer; and training means for training first probabilities of all of the basic mono-syllables and tones under "Segmental Probability Models" and training second probabilities under "Word-class-based Markov Chinese Language Models", and for transferring both the first probabilities and the second probabilities to the computer.

11. The Mandarin dictation machine of claim 10, wherein speech is input to the Mandarin dictation machine employing an isolated mono-syllable as an input unit.

12. The Mandarin dictation machine of claim 10, further comprising:

a display screen for displaying input phonetic symbols and Chinese characters corresponding to the input Mandarin speech; and error-correction computer code means for a user to directly correct errors on the display screen by using a mouse without touching a keyboard.

13. The Mandarin dictation machine of claim 10, further comprising dynamic short-term cache memory means for temporarily storing a vocabulary and a plurality of favorite words of the user or a plurality of specific words that are repetitively present in a block of input texts, wherein the plurality of favorite words or the plurality of specific words can be stored in different memory areas in accordance with a respective occurrence frequency, and the plurality of favorite words or the plurality of specific words along with respective occurrence frequency information thereof can be merged in global Chinese Language Models of the Mandarin dictation machine.

14. The Mandarin dictation machine of claim 13, wherein the dynamic short-term cache memory means further comprises a Frequently Used Dictionary and a Less Frequently Used Dictionary such that the Mandarin dictation machine will first search the Frequently Used Dictionary during operation, and will then search the Less Frequently Used Dictionary if a required word can not be located in the Frequently Used Dictionary, the required word located in the Less Frequently Used Dictionary will be stored in the Frequently Used Dictionary, while some words of a plurality of words in the Frequently Used Dictionary can be moved to the Less Frequently Used Dictionary when the some words of the plurality of words have not been frequently used within a specific time period.

15. The Mandarin dictation machine of claim 10, further comprising dynamic short-term cache memory means for temporarily storing a vocabulary and a plurality of favorite words of the user or a plurality of specific words that are repetitively present in a block of input texts, wherein the plurality of favorite words or the plurality of specific words can be stored in different memory areas in accordance with a respective occurrence frequency, and the plurality of favorite words or the plurality of specific words along with respective occurrence frequency information thereof can be cleared from the different memory areas after a completion of inputting the block of input texts.

16. A learning method for training a Mandarin dictation machine to be adaptive to a voice of a new user, comprising:

repetitively pronouncing a plurality of selected sentences that include all basic acoustic units of Mandarin speech including initials, finals and basic mono-syllables within a minimum number of possible characters such that frequently used basic acoustic units will occur frequently in the plurality of selected sentences, wherein the repetitive pronouncing step better trains "Segmental Probability Models" and trains the Mandarin dictation machine to be adaptive to pronunciations of the new user, the pronunciations of the new user being stored in the Mandarin dictation machine.

17. The learning method of claim 16, wherein the plurality of selected sentences for training the Mandarin dictation machine to be adaptive to the voice of the new user is selected from a source text file by a computer performing steps of:

setting different scores for all of the basic acoustic units of the Mandarin speech;

calculating a total score of each sentence of a plurality of sentences of the source text file such that a sentence of the plurality of sentences including more different basic acoustic units will obtain a higher total score;

selecting, with a higher priority the plurality of sentences with higher total scores; and describing an occurrence distribution of each of all of the basic acoustic units by means of a parameter which is also used as a criterion for selection of the plurality of selected sentences.

18. The learning method of claim 16, further comprising:

on-line learning during a learning stage or during practical use of the Mandarin dictation machine, wherein the Mandarin dictation machine learns correct pronunciation and words when the new user corrects text errors resulting from a recognition by the Mandarin dictation machine, and the Mandarin dictation machine stores corresponding parameters of pronunciation corrected by the new user.

19. The learning method of claim 16, further comprising:

pronouncing a mono-syllable by the new user and establishing the "Segmental Probability Models" of the new user by selecting a plurality of Mixtures of Gaussian Probabilities under the "Segmental Probability Models" for many speakers and de-emphasizing other unnecessary Mixtures of Gaussian Probabilities;

calculating new Mixtures of Gaussian Probabilities and updating the "Segmental Probability Models" by averaging feature vectors of a plurality of segments of a new pronunciation of the mono-syllable when the new user continuously pronounces the mono-syllable;

repeating the calculating step so that a ratio of the Mandarin speech of the new user in the "Segmental Probability Models" that can better describe the Mandarin speech of the new user;

automatically averaging environmental noise in an environment of the new user into the "Segmental Probability Models" to make the Mandarin dictation machine adaptive to ambient noise in the environment of the new user, wherein the step of automatically averaging the environmental noise is performed at a same time as the pronouncing step, the calculating step, and the repeating step.

* * * * *